United States Patent
Wang et al.

(10) Patent No.: US 12,386,838 B2
(45) Date of Patent: Aug. 12, 2025

(54) SPATIAL JOIN QUERY METHOD AND APPARATUS, ELECTRONIC DEVICE, AND STORAGE MEDIUM

(71) Applicant: JINGDONG CITY (BEIJING) DIGITS TECHNOLOGY CO., LTD., Beijing (CN)

(72) Inventors: Rubin Wang, Beijing (CN); Jie Bao, Beijing (CN); Ruiyuan Li, Beijing (CN); Huajun He, Beijing (CN); Chujing Tan, Beijing (CN)

(73) Assignee: JINGDONG CITY (BEIJING) DIGITS TECHNOLOGY CO., LTD., Beijing (CN)

( * ) Notice: Subject to any disclaimer, the term of this patent is extended or adjusted under 35 U.S.C. 154(b) by 10 days.

(21) Appl. No.: 18/259,407

(22) PCT Filed: Sep. 22, 2021

(86) PCT No.: PCT/CN2021/119520
§ 371 (c)(1),
(2) Date: Jun. 27, 2023

(87) PCT Pub. No.: WO2022/142503
PCT Pub. Date: Jul. 7, 2022

(65) Prior Publication Data
US 2024/0061842 A1     Feb. 22, 2024

(30) Foreign Application Priority Data
Dec. 31, 2020   (CN) ........................ 202011638237.4

(51) Int. Cl.
*G06F 16/2455* (2019.01)
*G06F 16/22* (2019.01)
*G06F 16/2458* (2019.01)

(52) U.S. Cl.
CPC ...... *G06F 16/2456* (2019.01); *G06F 16/2246* (2019.01); *G06F 16/2471* (2019.01)

(58) Field of Classification Search
CPC ............. G06F 16/2456; G06F 16/2246; G06F 16/2471
See application file for complete search history.

(56) References Cited

U.S. PATENT DOCUMENTS 6,745,198 B1    6/2004   Luo et al.
2009/0094010 A1 4/2009   Kothuri et al.
(Continued)

FOREIGN PATENT DOCUMENTS

CN    106055563 A    10/2016
CN    106909639 A    6/2017
(Continued)

OTHER PUBLICATIONS

Xuejun Wang et al., Geographical information system, Published on Dec. 31, 1993, p. 48-57.
(Continued)

*Primary Examiner* — Grace Park
(74) *Attorney, Agent, or Firm* — Qinghong Xu

(57) ABSTRACT

A spatial join query method and apparatus, an electronic device, and a storage medium. The spatial join query method comprises: obtaining a first resilient distributed dataset of first spatial data and a second resilient distributed dataset of second spatial data; generating multi-tree spatial indexes for spatial partitions, and collecting statistics about spatial distribution information of geometric objects according to the multi-tree spatial indexes to obtain global spatial distribution information; determining an overlapping spatial partition according to the global spatial distribution information; and setting data, in the first spatial data and the second spatial data, corresponding to the overlapping spatial partition as (Continued)

target data, and performing spatial join calculation on the target data.

14 Claims, 6 Drawing Sheets

(56) References Cited

U.S. PATENT DOCUMENTS

| | | | |
|---|---|---|---|
| 2009/0182837 | A1 | 7/2009 | Rogers et al. |
| 2014/0052711 | A1 | 2/2014 | Bamba et al. |
| 2017/0311295 | A1* | 10/2017 | Soldati ................. H04W 72/04 |
| 2018/0149485 | A1* | 5/2018 | Samet ................... G06F 16/951 |
| 2020/0371993 | A1* | 11/2020 | Briseno ................ G06F 16/134 |

FOREIGN PATENT DOCUMENTS

| | | |
|---|---|---|
| CN | 109947889 A | 6/2019 |
| CN | 110413611 A | 11/2019 |
| CN | 110597935 A | 12/2019 |
| CN | 111538735 A | 8/2020 |
| CN | 111563081 A | 8/2020 |
| JP | 2010160591 A | 7/2010 |
| JP | 2014191720 A | 10/2014 |
| KR | 20190079354 A | 7/2019 |

OTHER PUBLICATIONS

2nd Office Action dated Sep. 9, 2023 for Chinese Application No. 202011638237.4.
Notice of Allowance dated Feb. 20, 2024 for Chinese Application No. 202011638237.4.
1st Office Action dated Apr. 21, 2023 of Chinese Application No. 202011638237.4.
International Search Report dated Dec. 21, 2021 of International Application No. PCT/CN2021/119520.
Wang Xiaolong, "Research of Query Processing Technology forGeospatial Big Data Based on Spark", Apr. 15, 2018.
1st Office Action dated Jul. 30, 2024 of Japanese Application No. 2023-540699.

* cited by examiner (a) Spatial partitioning stage  (b) Parallel computing stage (a)local index  (b)spatial distribution statistics and encoding

SPATIAL JOIN QUERY METHOD AND APPARATUS, ELECTRONIC DEVICE, AND STORAGE MEDIUM

CROSS-REFERENCE OF RELATED APPLICATION

The present application is a U.S. National Stage of International Application No. PCT/CN2021/119520, filed on Sep. 22, 2021, which claims benefit of priority to Chinese Application No. 202011638237.4, filed on Dec. 31, 2020, both of which are incorporated herein by reference in their entireties for all purposes.

TECHNICAL FIELD

The present disclosure relates to the technical field of spatial data analysis, and in particular, to a spatial join query method, an apparatus, an electronic device, and a storage medium.

BACKGROUND

Spatial data contains rich value, and spatial data analysis technology is the basis of spatial data mining. Spatial join query is an important operation in spatial analysis technology. Through spatial join query, it is possible to determine the spatially intersecting geometric objects of a plurality of spatial datasets.

SUMMARY

According to one aspect of the present disclosure, a method for spatial join query includes: obtaining a first resilient distributed dataset of first spatial data and a second resilient distributed dataset of second spatial data; wherein the first resilient distributed dataset and the second resilient distributed dataset include a plurality of spatial partitions; generating multi-tree spatial indexes for the spatial partitions, and collecting statistics about spatial distribution information of geometric objects according to the multi-tree spatial indexes, and obtaining global spatial distribution information of the first resilient distributed dataset and global spatial distribution information of the second resilient distributed dataset; determining an intersecting spatial partition of the first resilient distributed dataset and the second resilient distributed dataset according to the global spatial distribution information; and setting data corresponding to the intersecting spatial partition in the first spatial data and the second spatial data as target data, and performing spatial join calculation on the target data.

In some embodiments, generating the multi-tree spatial indexes for the spatial partitions, and collecting statistics about spatial distribution information of geometric objects according to the multi-tree spatial indexes, includes: generating quad-tree spatial indexes for the spatial partitions, so as to divide the spatial partitions into a plurality of subspaces; and obtaining the spatial distribution information of the geometric objects by querying a number of target geometric objects in each subspace according to the quad-tree spatial indexes; wherein, the subspaces are the smallest subspaces containing the target geometric objects.

In some embodiments, generating quad-tree spatial index for the spatial partitions includes: generating quad-tree spatial indexes in parallel for all the spatial partitions by a Spark engine.

In some embodiments, collecting statistics about spatial distribution information of geometric objects according to the multi-tree spatial indexes, and obtaining global spatial distribution information of the first resilient distributed dataset and global spatial distribution information of the second resilient distributed dataset, includes: collecting statistics about the spatial distribution information of geometric objects corresponding to each of the spatial partitions according to the multi-tree spatial indexes; obtaining the global spatial distribution information of the first resilient distributed dataset and the global spatial distribution information of the second resilient distributed dataset by aggregating the spatial distribution information of the geometric objects corresponding to all the spatial partitions.

In some embodiments, determining an intersecting spatial partition of the first resilient distributed dataset and the second resilient distributed dataset according to the global spatial distribution information, includes: determining peer nodes level by level according to the global spatial distribution information; wherein, the peer nodes are nodes which have the same path in the global spatial distribution information corresponding to the first resilient distributed dataset and the second resilient distributed dataset node; screening the peer nodes according to a statistical value of each node in the peer nodes, and obtaining the intersecting spatial partition of the first resilient distributed dataset and the second resilient distributed dataset; wherein, the statistic value is a statistic result of collecting statistics about the spatial distribution information of geometric object.

In some embodiments, screening the peer nodes according to a statistical value of each node in the peer nodes, and obtaining the intersecting spatial partition of the first resilient distributed dataset and the second resilient distributed dataset, includes: in response to that the peer nodes include a leaf node and a non-leaf node, determining whether the statistical values of the leaf node and a parent node of the leaf node are both 0; in response to that any one of the statistical values of the leaf node and the parent node of the leaf node is not 0, setting the spatial partition corresponding to the peer nodes as an intersecting spatial partition of the first resilient distributed dataset and the second resilient distributed dataset; in response to that the peer nodes include two non-leaf nodes, determining the peer nodes level by level according to the global spatial distribution information; in response to that the peer nodes comprise two leaf nodes, determining whether neither of the statistical values of the two leaf nodes are 0; if neither of the statistical values of the two leaf nodes are 0, setting the spatial partition corresponding to the peer nodes as the intersecting spatial partition of the first resilient distributed dataset and the second resilient distributed dataset.

In some embodiments, setting data corresponding to the intersecting spatial partition in the first spatial data and the second spatial data as target data, includes: determining a target spatial range corresponding to the intersecting spatial partition; querying the geometric objects intersecting with the target spatial range in the first spatial data and the second spatial data from a root node of the global spatial distribution information from top to bottom; and setting spatial data of the geometric objects intersecting with the target spatial range as the target data.

According to another aspect of the present disclosure, a device for spatial join query includes: a dataset obtaining module for obtaining a first resilient distributed dataset of first spatial data and a second resilient distributed dataset of second spatial data; wherein the first resilient distributed dataset and the second resilient distributed dataset resilient distributed datasets comprises a plurality of spatial partitions; a spatial distribution information obtaining module for generating multi-tree spatial indexes for the spatial partitions, and collecting statistics about spatial distribution information of geometric objects according to the multi-tree spatial indexes, and obtaining global spatial distribution information of the first resilient distributed dataset and global spatial distribution information of the second resilient distributed dataset; an intersecting space determining module for determining an intersecting spatial partition of the first resilient distributed dataset and the second resilient distributed dataset according to the global spatial distribution information; and a spatial join query module for setting data corresponding to the intersecting spatial partition in the first spatial data and the second spatial data as target data, and performing spatial join calculation on the target data.

According to another aspect of the present disclosure, a storage medium on which a computer program is stored, and when the computer program is executed, the steps of the above-mentioned method for spatial join query are implemented.

According to another aspect of the present disclosure, an electronic device includes a memory and a processor, wherein a computer program is stored in the memory, and when the processor invokes the computer program in the memory, the steps of the above-mentioned method for spatial join query are implemented.

According to another aspect of the present invention, a method for spatial join query, includes: obtaining a first resilient distributed dataset of first spatial data and a second resilient distributed dataset of second spatial data; wherein the first resilient distributed dataset and the second resilient distributed dataset comprise a plurality of spatial partitions; generating multi-tree spatial indexes for the spatial partitions, and collecting statistics about spatial distribution information of geometric objects according to the multi-tree spatial indexes, and obtaining global spatial distribution information of the first resilient distributed dataset and global spatial distribution information of the second resilient distributed dataset; determining an intersecting spatial partition of the first resilient distributed dataset and the second resilient distributed dataset according to the global spatial distribution information; and setting data corresponding to the intersecting spatial partition in the first spatial data and the second spatial data as target data, and performing spatial join calculation on the target data.

BRIEF DESCRIPTION OF THE DRAWINGS

In order to describe the embodiments of the present disclosure more clearly, the following will briefly introduce the drawings that are used in the embodiments. Obviously, the drawings in the following description are only some embodiments of the present disclosure. For those skilled in the art, other drawings may also be obtained from these drawings without paying inventive labor.

DETAILED DESCRIPTION

In order to make the purposes, technical solutions and advantages of the embodiments of the present disclosure more clear, the technical solutions in the embodiments of the present disclosure will be described clearly and completely below with reference to the drawings in the embodiments of the present disclosure. Obviously, the described embodiments is a part of the embodiments of the present disclosure, but not all of the embodiments. Based on the embodiments in the present disclosure, all other embodiments obtained by those of ordinary skill in the art without paying inventive labor should fall within the protection scope of the present disclosure.

In related art, spatial join query is mainly implemented through spatial partitioning operations and parallel computing operations. In the process of spatial partitioning, a sample set is usually extracted from a spatial dataset according to a certain sampling rate, and the spatial distribution of the sample set is used to approximate the spatial distribution of full data, in order to obtain spatial partition data that requires parallel computing operations. However, there are a lot of invalid data in the spatial partition data obtained by the above method, and the efficiency of the spatial join query is low.

Figure 1:
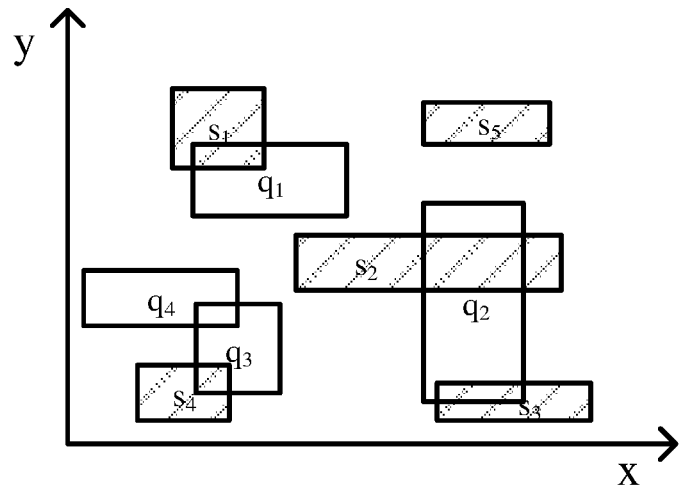
FIG. 1 is a schematic diagram of a result of a spatial join query according to one or more embodiments of the present disclosure.

With the advancement of the informatization process and the widespread use of mobile internet devices, massive amounts of data with spatial location information are also generated. With the development of distributed technology, the increasingly mature distributed database, distributed computing engine and other frameworks provide distributed solutions for the storage and analysis of massive spatial data, and the Spark distributed computing engine provides rich spatial operators for analysis of the spatial big data, including spatial topological relation query, spatial range query, spatial nearest neighbor query and spatial join query, etc. Spatial join query refers to query the geometric object s that intersects with q in the spatial dataset S in space for each geometric object q in the spatial dataset Q, and finally return the set of two-tuples (q, s) of the geometric objects. As shown in FIG. 1, which is a schematic diagram of a result of a spatial join query according to one or more embodiments of the present disclosure. The spatial join of geometric objects $s_{1-5}$ and $q_{1-5}$ is denoted as {(q1, s1), (q2, s2), (q2, s3), (q3, s4)}. X and Y in FIG. 1 represent the horizontal direction and the vertical direction.

Figure 2:
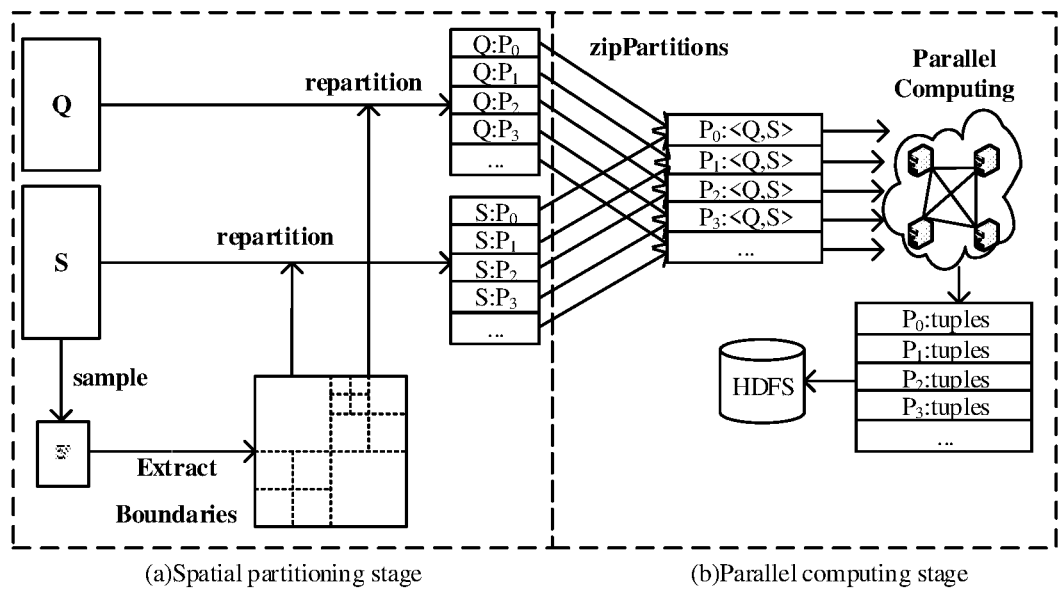
FIG. 2(a) and FIG. 2(b) are schematic diagrams of principle of a method of a Spark-based spatial join query.

The implementation method of the existing Spark distributed spatial join query technology may be summarized into two stages: spatial partitioning and parallel computing. As shown in FIG. 2(a) and FIG. 2(b), FIG. 2(a) and FIG. 2(b) are schematic diagrams of the principle of a method for Spark-based spatial join query. As shown in FIG. 2(a), in the spatial partitioning stage, the sample set S' is extracted by sample operator of Spark from the dataset S at the sampling rate p, and then the spatial distribution of the sample set S' is used to approximate the spatial distribution of full data S. According to the density of samples, the entire spatial range is divided by spatial index algorithms such as Quad-tree, R-tree or KD-tree to generate a small range of spatial partitions to ensure that the amount of data within each spatial partition is as equal as possible. Then, the geometric objects in the datasets Q and S are projected into the spatial partitions that intersect with them by repartition operator of Spark. The data of each spatial partition constitutes a partition (spatial partition) of Spark RDD (Resilient Distributed Dataset). As shown in FIG. 2(b), in the parallel computing stage, the resilient distributed datasets of the two datasets are converted into a composite resilient distributed dataset by zipPartitions operator of Spark. The data from the same spatial partition is aggregated to the same partition, and then parallel computing is performed by the traditional stand-alone version of the spatial join query algorithm. A set of two-tuples is generated by performing spatial join query on the spatial objects from Q and S in each partition, and finally the operation result is output to the distributed file system HDFS.

The above-mentioned traditional Spark-based spatial join query scheme uses the spatial density of the sample set S' of the dataset S as the basis for dividing the spatial partition, but the spatial distribution of the sample set S' may not fully represent the spatial distribution of the full dataset S, and may not represent the spatial distribution of the full dataset Q, resulting in a signifimayt difference in the density of the data from S and Q within each spatial partition.

Figure 3:
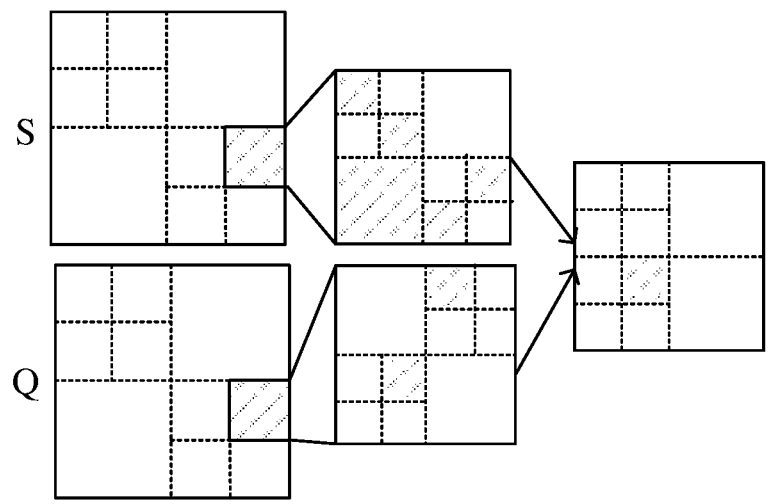
FIG. 3 is a schematic diagram of a result of a spatial partition filtering algorithm according to one or more embodiments of the present disclosure.

Referring to FIG. 3. FIG. 3 is a schematic diagram of the results of a spatial partition filtering algorithm according to one or more embodiments of the disclosure. datasets Q and S have data in the same partition (boxes with oblique lines), but the distribution of S within the partition is dense while the distribution of Q within the partition is sparse. Ultimately, the spatial range of the intersecting part of the two datasets within the partition is much smaller than the spatial range of the partition. It may be seen that the above Spark-based spatial join query scheme does not filter out invalid data that does not contribute to the final result in the spatial partitioning stage, resulting in a large amount of invalid data participating in the spatial join calculation process. The calculation and transmission of invalid data will cause a lot of waste of CPU, memory and network resources, which will lead to a long calculation process of spatial join query. In order to solve the defects existing in the above-mentioned traditional solutions, the present disclosure provides the following new spatial join query solutions, which may remove invalid data and improve the efficiency of spatial join query.

Figure 4:
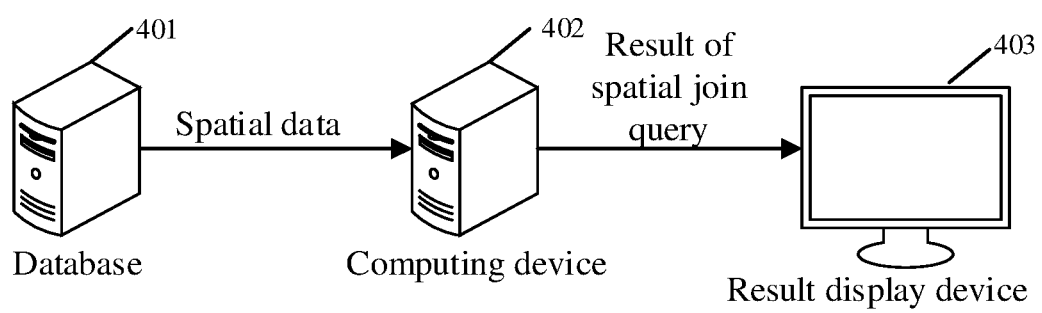
FIG. 4 is a schematic structural diagram of a system for spatial join query according to one or more embodiments of the present disclosure.

Referring to FIG. 4, FIG. 4 is a schematic structural diagram of a system for spatial join query according to one or more embodiments of the present disclosure. The system for spatial join query may include a database 401, a computing device 402, and a result display device 403. The database 401 may store spatial data of various geometric objects, for example, the database 401 may include spatial data of railway distribution, spatial data of river distribution, spatial data of road distribution, etc. in a certain area. The computing device 402 may obtain spatial data of two or more geometric objects from the database 401, and then determine the spatial joins between the geometric objects. Specifically, after receiving the spatial data, the computing device 402 may perform the spatial partitioning operation and the parallel computing operation successively. When performing the spatial partitioning operation, the computing device 402 determines the intersecting spatial partitions according to the spatial distribution information of the geometric objects in the spatial data, and then uses the spatial data of the intersecting spatial partitions as input data for parallel computing. The above process only calculates the intersecting spatial partitions, which may reduce the calculation of invalid data in the process of spatial join query and improve the efficiency of spatial join query. After the computing device 402 obtains the result of the spatial join query, the result may be displayed through the result display device 403 for the user to observe and analyze.

Figure 5:
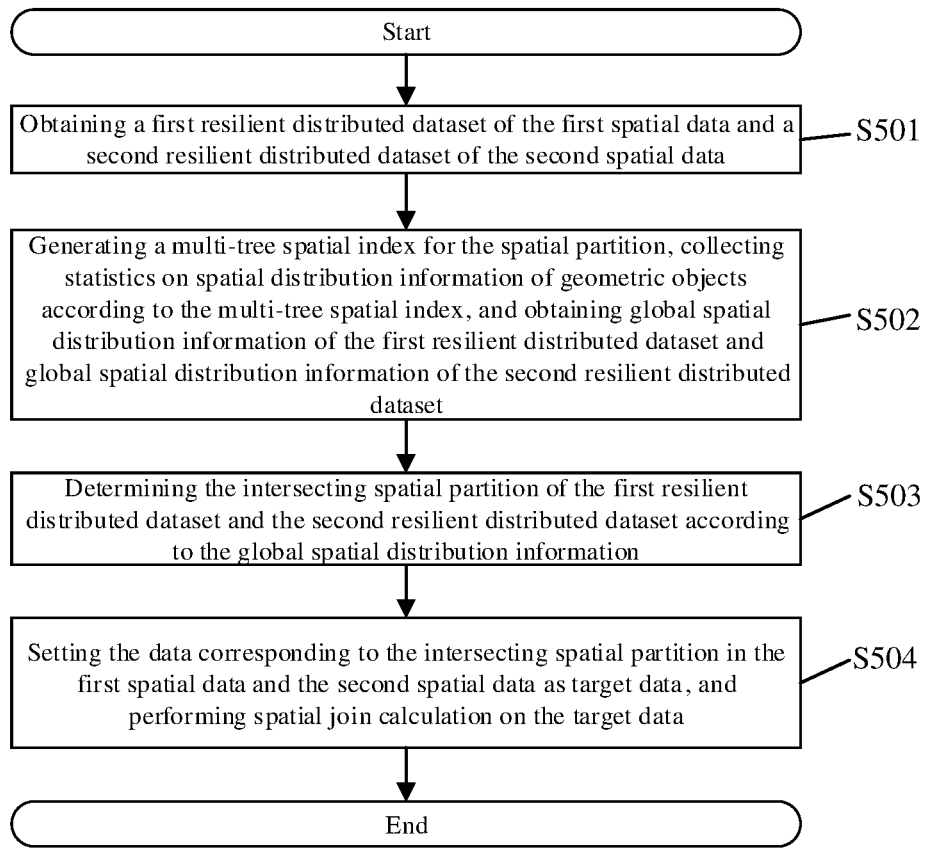
FIG. 5 is a flowchart of a method for spatial join query according to one or more embodiments of the present disclosure.

Referring to FIG. 5 below, FIG. 5 is a flowchart of a method for spatial join query according to one or more embodiments of the present disclosure.

Specific steps may include the following steps.

S501: Obtaining a first resilient distributed dataset of the first spatial data and a second resilient distributed dataset of the second spatial data.

Before this step, there may also be an operation of obtaining the first spatial data and the second spatial data, and the spatial data is data for describing the spatial distribution of a certain geometric object (such as mountains, rivers, roads, forests, etc.). Specifically, the first spatial data is data for describing the spatial distribution of the first geometric object, and the second spatial data is data for describing the spatial distribution of the second geometric object.

In this embodiment, the first spatial data and the second spatial data may be represented by the resilient distributed dataset respectively on the electronic device installed with the Spark engine, and then the first resilient distributed dataset of the first spatial data and the second resilient distributed dataset of the second spatial data may be obtained. The resilient distributed dataset may include a plurality of spatial partitions, that is, the first resilient distributed dataset and the second resilient distributed dataset mentioned in this embodiment respectively include a plurality of spatial partitions.

S502: Generating a multi-tree spatial index for the spatial partition, collecting statistics on spatial distribution information of geometric objects according to the multi-tree spatial index, and obtaining global spatial distribution information of the first resilient distributed dataset and global spatial distribution information of the second resilient distributed dataset.

After obtaining the first resilient distributed dataset and the second resilient distributed dataset, in this step, the operation of generating a multi-tree spatial index is performed on the spatial partitions included in the above two resilient distributed datasets. The basic idea of multi-tree index is to recursively divide geographic space into different levels of tree structures. The specific multi-tree space index may divide the space of a known range into a plurality of equal subspaces, recursively continuing until the tree reaches a certain depth or meets preset requirements. As a feasible implementation manner, in this embodiment, a binary tree space index, a quad-tree space index, or an octree space index may be generated for the spatial partition, so as to divide the spatial partition into a plurality of subspaces.

Further, the present disclosure may also collect statistics about the spatial distribution information of geometric objects according to the spatial index of multi-tree, and the above-mentioned spatial distribution information of geometric objects is specifically the distribution status of geometric objects in the subspace after generating the spatial index of multi-tree. The spatial distribution information of geometric objects in each partition space may be determined by collecting statistics about the spatial distribution information of geometric objects according to the multi-tree spatial index. In the present disclosure, the global spatial distribution information of the first resilient distributed dataset and the global spatial distribution information of the second resilient distributed dataset may be obtained by aggregating the spatial distribution information of the geometric objects of all partition spaces included in the resilient distributed dataset. The global spatial distribution information refers to the distribution information of all geometric objects in the first spatial data or the second spatial data.

S503: Determining the intersecting spatial partition of the first resilient distributed dataset and the second resilient distributed dataset according to the global spatial distribution information.

After obtaining the global spatial distribution information, in this embodiment, the global spatial distribution information of the first resilient distributed dataset is compared with the global spatial distribution information of the second resilient distributed dataset, and the intersecting spatial partition of the two is obtained. The intersecting spatial partition refers to the same area where geometric objects exist in both the first resilient distributed dataset and the second resilient distributed dataset. For example, according to the global spatial distribution information of the first resilient distributed dataset, it may be known that there are roads in the three areas A, B, and C, and according to the global spatial distribution information of the second resilient distributed dataset, it may be known that there are roads in the three regions B, C, and D, so the intersection spatial partitions of the two are B area and C area.

S504: Setting the data corresponding to the intersecting spatial partition in the first spatial data and the second spatial data as target data, and performing spatial join calculation on the target data.

It may be understood that the intersecting spatial partition is an area including geometric objects. The location where the two geometric objects are spatially joined is in the intersecting spatial partition, and there is no spatial join in the area after the intersecting spatial partition. In this disclosure, the data corresponding to the intersecting spatial partition in the first spatial data and the second spatial data is set as the target data, which is equivalent to filtering out the spatial data of other regions except the intersecting spatial partition, thereby reducing the ratio of the invalid data participating in the spatial join query operation, and improving the efficiency of spatial join query. In this embodiment, invalid data is filtered out in the spatial partitioning stage, which may greatly reduce the amount of data involved in the subsequent calculation process, thereby reducing the pressure on data transmission and computing resources between machines, making the entire computing process lighter, greatly improving query computing efficiency, and shortening the calculation time.

In this embodiment, a resilient distributed dataset of spatial data is obtained, and a spatial index of a multi-tree is generated for the spatial partitions in the resilient distributed dataset, so as to subdivide the spatial partition into a plurality of subspaces. The global spatial distribution information for describing the distribution of the geometric objects in the resilient distributed dataset may be obtained by statistics on the spatial distribution information of the geometric objects. In this embodiment, the intersecting spatial partition is determined based on the global spatial distribution information of the first resilient distributed dataset and the second resilient distributed dataset, and the target data that needs to perform a spatial join query is determined according to the intersecting spatial partition. Since only the geometric object in the intersecting spatial partition has a join, the above solution may filter out invalid data in the spatial data that do not contribute to the spatial join query, thereby reducing the computational complexity of the spatial join query operation, and improving the efficiency of spatial join query.

As a further introduction to the process of generating a multi-tree spatial index and collecting statistics about spatial distribution information of geometric object in the above-mentioned embodiment, the following operations may be combined with the above-mentioned embodiment to obtain a further implementation: generating a quad-tree spatial index for the spatial partition, so as to divide the spatial partition into a plurality of subspaces; querying the number of target geometric objects in each subspace according to the quad-tree spatial index, and obtaining the spatial distribution information of the geometric object; wherein, the subspace is the smallest subspace containing the target geometric object.

Figure 6:
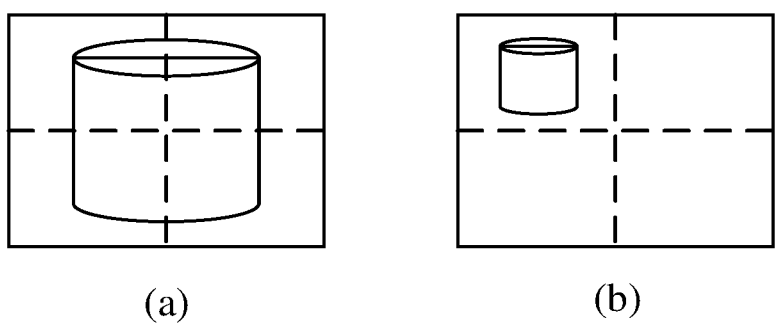
FIG. 6(a) and FIG. 6(b) are schematic diagrams of spatial distribution information of a geometric object according to one or more embodiments of the present disclosure.

In the above process, the number of objects of target set contained in each subspace after generating the quad-tree spatial index is used as the spatial distribution information of geometric object. In the above process, the spatial distribution information of geometric objects is obtained by collecting statistics about the number of target geometric objects completely contained in the subspace. Said "completely contained" means that the current subspace for statistics is the smallest subspace containing the target geometric object. Referring to FIG. 6(*a*) and FIG. 6(*b*), FIG. 6(*a*) and FIG. 6(*b*) are schematic diagrams of the spatial distribution information of geometric objects according to one or more embodiments of the present disclosure. In FIG. 6(*a*), the number of target geometric objects included in the largest solid-line rectangular frame is 1, and the number of target geometric objects included in the small rectangular frame is 0; in FIG. 6(*b*), the number of target geometric objects included in the small rectangular box in the upper left corner is 1, and the number of target geometric objects included in the remaining small rectangular boxes and the largest solid-line rectangular box is 0.

Figure 7:
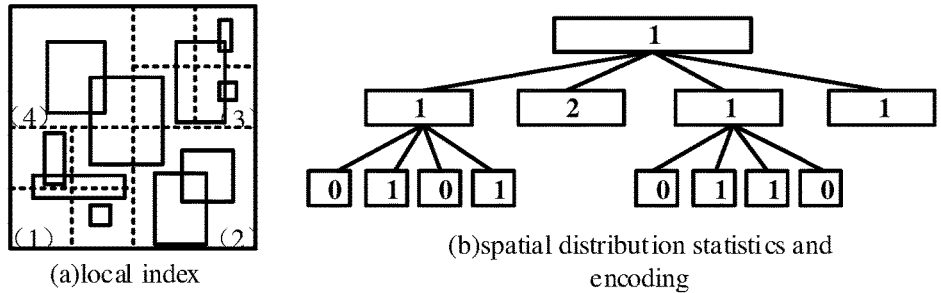
FIG. 7(a) and FIG. 7(b) are schematic diagrams of generating an index and geometric spatial distribution information of a spatial partition according to one or more embodiments of the present disclosure.

Referring to FIG. 7(*a*) and FIG. 7(*b*), FIG. 7(*a*) and FIG. 7(*b*) are schematic diagrams of generating the index and geometric spatial distribution information of the spatial partition provided by the embodiment of the present disclosure. As shown in FIG. 7(*a*) and FIG. 7(*b*), in this embodiment, the parallel computing capability of Spark may be used to generate a local quad-tree index for each spatial partition, and the distribution of spatial data may be extracted from the index. As shown in FIG. 7(a), a space may be recursively divided into 4 subspaces, and each geometric object is located in the smallest subspace containing the object. As shown in FIG. 7(b), the spatial distribution of geometric objects is extracted from the index, that is, collecting statistics about the number of geometric objects in each subspace (i.e., the numbers in the rectangle in FIG. 7). Specifically, in the process of recursively dividing a space into 4 subspaces, it may be determined whether to continue the operation of dividing into 4 subspaces according to the amount of data contained in the obtained subspaces. If the amount of data contained in the subspace is less than the preset value, the operation of recursively dividing the space into 4 subspaces may be stopped.

In order to reduce the amount of data transmitted by the network, in this embodiment, the statistical result in each spatial partition may be serialized encoded. The encoding principle is to collect the statistical value of each node by pre-order traversal algorithm, identify the statistical value of the leaf node by '#' symbol, and then concatenate the statistical value of each node into a string with commas. For example, the string of statistical values in FIG. 7(b) is: 1, 1, #0, #1, #0, #1, #2, 1, #0, #1, #1, #0, #1.

Figure 8:
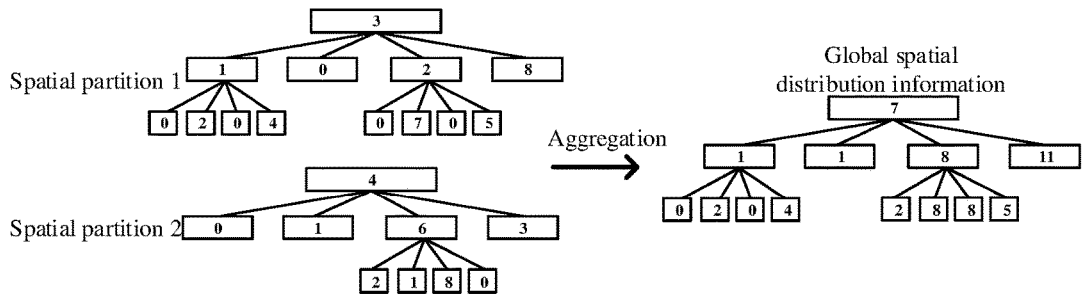
FIG. 8 is a schematic diagram of principle of obtaining global spatial distribution information according to one or more embodiments of the present disclosure.

As a further introduction to the process of generating a multi-tree spatial index and collecting statistics about the spatial distribution information of geometric objects in the above embodiment, in this embodiment, the spatial distribution information of geometric objects corresponding to each spatial partition may be counted according to the multi-tree spatial index; the global spatial distribution information of the first resilient distributed dataset and the global spatial distribution information of the second resilient distributed dataset may be obtained by aggregating the spatial distribution information of the geometric objects corresponding to all the spatial partitions. Specifically, the global spatial distribution information may be obtained by adding and aggregating the statistical values of the nodes of the same path. Referring to FIG. 8, FIG. 8 is a schematic diagram of a principle of obtaining global spatial distribution information according to one or more embodiments of the present disclosure. In this embodiment, the codes of the spatial distribution information in each spatial partition may be collected together by collect operator of Spark, and then they are decoded and aggregated to generate global spatial distribution information for the entire dataset. As shown in FIG. 8, the left is the spatial distribution information of each spatial partition, and the right is the global spatial distribution information aggregated to generate the entire dataset.

As a further introduction to the determination of the intersecting spatial partitions of the first resilient distributed dataset and the second resilient distributed dataset in the above embodiment, in this embodiment, the intersecting spatial partitions may be obtained in the following manner: determining peer nodes level-by-level according to the global spatial distribution information; obtaining the intersecting spatial partition of the first resilient distributed dataset and the second resilient distributed dataset by screening the peer nodes according to the statistical value of each node in the peer nodes.

The above-mentioned peer nodes are nodes with the same path in the global spatial distribution information corresponding to the first resilient distributed dataset and the second resilient distributed dataset. The peer nodes have the same levels and locations in the first resilient distributed dataset and the second resilient distributed dataset. The above-mentioned statistical value is a statistical result of the spatial distribution information of the geometric objects, that is, the number of target geometric objects in the spatial partition corresponding to the node.

Figure 9:
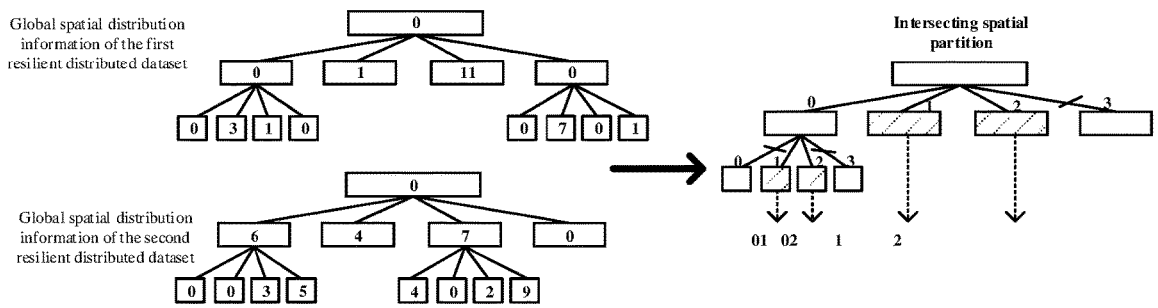
FIG. 9 is a schematic diagram of principle of determining an intersecting spatial partition according to one or more embodiments of the present disclosure.

Referring to FIG. 9, FIG. 9 is a schematic diagram of a principle of determining an intersecting spatial partition according to one or more embodiments of the present disclosure. As shown in FIG. 9, in this embodiment, the global spatial distribution information of the first resilient distributed dataset and the global spatial distribution information of the second resilient distributed dataset may be obtained. The spatial partition of the intersection of the two datasets (i.e., the rectangle filled with slashes in FIG. 9) may be obtained by calculating the global spatial distribution information of the two datasets. In order to facilitate the transmission of spatial partition information between networks, in this embodiment, each partition may also be identified by a path traversed by each partition from the root node to the leaf node.

Specifically, in this embodiment, peer nodes may be screened according to the following three rules:

Rule 1: If the peer nodes includes a leaf node and a non-leaf node, it is determined whether the statistical values of the leaf node and the parent node of the leaf node are both 0; if any one of the statistical values of the leaf node and the parent node of the leaf node is not 0, the spatial partition corresponding to the peer nodes is set as the intersecting spatial partition of the first resilient distributed dataset and the second resilient distributed dataset; if the statistical values of the leaf node and the parent node of the leaf node are both 0, statistical value analysis on the child nodes of the peer nodes is stopped, and screening of other peer nodes according to the statistical value of each node in the other peer nodes continues. A leaf node is a node without child nodes, and a non-leaf node is a node with child nodes.

Rule 2: If the peer nodes include two non-leaf nodes, the operation of determining the peer node level by level according to the global spatial distribution information continues.

Rule 3: If the peer nodes include two leaf nodes, it is determined whether neither of the statistical values of the two leaf nodes are 0; if neither of the statistical values of the two leaf nodes are 0, the spatial partition corresponding to the peer node is set as the intersecting spatial partition of the first resilient distributed dataset and the second resilient distributed dataset; if at least one of the statistical values of the two leaf nodes are 0, screening of other peer nodes according to the statistical value of each node in other peer nodes continues.

Figure 10:
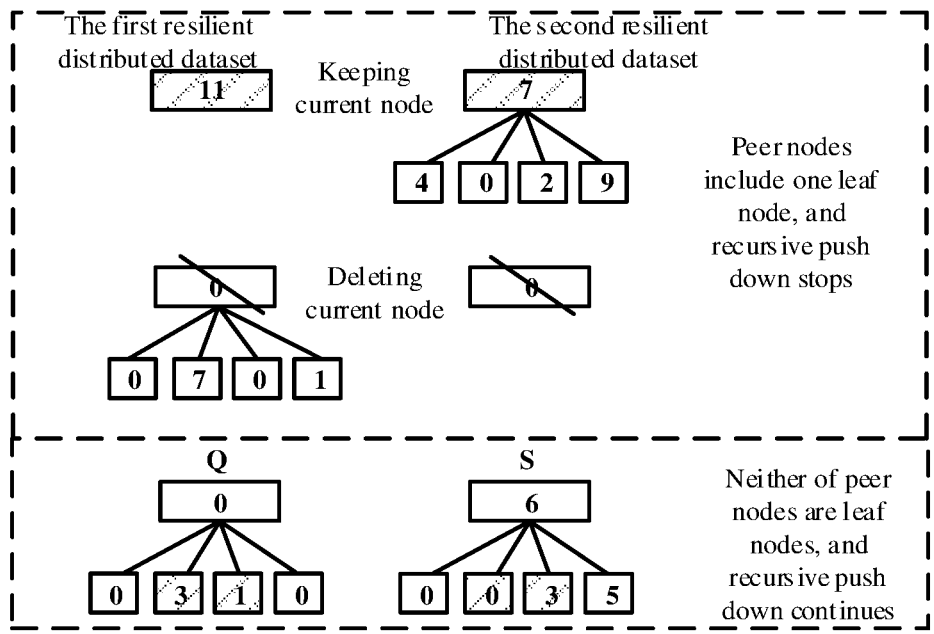
FIG. 10 is a schematic diagram of a process for determining an intersecting spatial partition according to one or more embodiments of the present disclosure.

Referring to FIG. 10. FIG. 10 is a schematic diagram of a process of determining an intersecting spatial partition according to one or more embodiments of the present disclosure. As shown in FIG. 10, if one of the two peer nodes in the first resilient distributed dataset and the second resilient distributed dataset is a leaf node, and the statistical values of the leaf node and its parent node are both 0, then the two peer nodes and their children are filtered out, otherwise the intersecting partitions represented by the two peer nodes are kept and recursive push down stops. If neither of the two peer nodes in the first resilient distributed dataset and the second resilient distributed dataset are leaf nodes, recursive push down continues. Recursive push down refers to the operation of comparing and analyzing the statistical values of the child nodes of the peer node. Since the statistical value is the statistical result of the spatial distribution information of the geometric objects, if neither of the statistical values of the two peer nodes are 0, it indicates that there are intersecting spatial partitions in the two peer nodes;

if at least one of the statistical values of the two peer nodes is 0, it indicates that there is no intersecting spatial partition between the two peer nodes.

Figure 11:
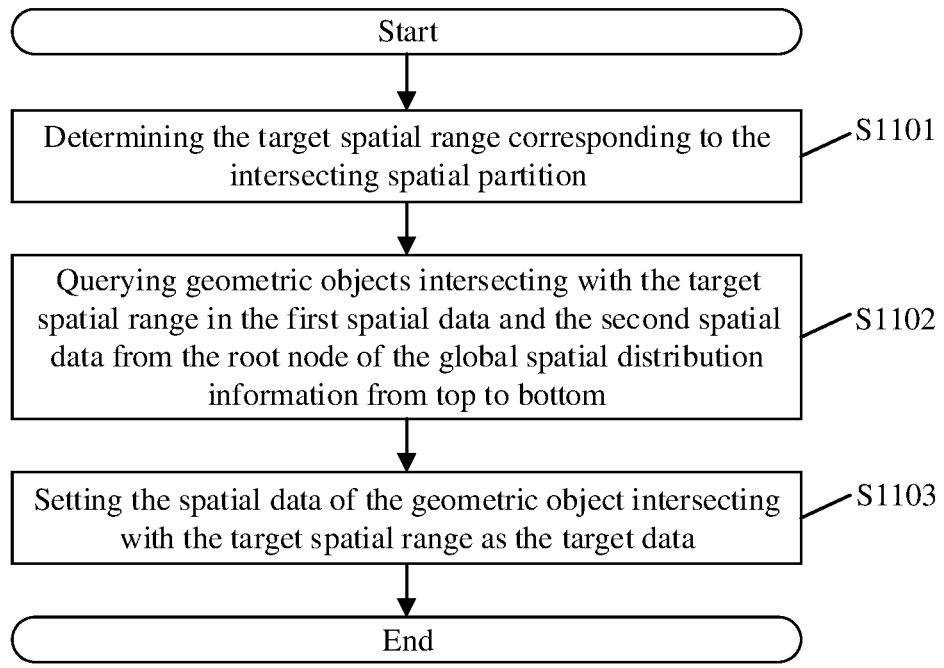
FIG. 11 is a flowchart of a method for determining target data according to one or more embodiments of the present disclosure.

Referring to FIG. 11, FIG. 11 is a flowchart of a method for determining target data according to one or more embodiments of the present disclosure. This embodiment is a further description of the process of setting data corresponding to an intersecting spatial partition as target data in the above-mentioned embodiment, this embodiment may be combined with the above-mentioned embodiment to obtain a further implementation manner, and in this embodiment, the method may include the following steps: S1101, determining the target spatial range corresponding to the intersecting spatial partition; S1102, querying geometric objects intersecting with the target spatial range in the first spatial data and the second spatial data from the root node of the global spatial distribution information from top to bottom; S1103, setting the spatial data of the geometric object intersecting with the target spatial range as the target data.

The above operation of selecting target data is equivalent to removing invalid data. On the basis of obtaining the first resilient distributed dataset and the second resilient distributed dataset, the target spatial range corresponding to the intersecting spatial partition is determined, and then the geometric object within the target spatial range in the first space data and the second spatial data is queried. The global spatial distribution information describes the distribution status of the geometric objects in the spatial data. Therefore, the geometric object intersecting with the target spatial range may be obtained by querying from the root node of the global spatial distribution information from top to bottom. Further, in this embodiment, the spatial data of the geometric object intersecting with the target spatial range may be set for performing spatial join calculation.

As a feasible implementation manner, in this embodiment, the intersecting spatial partitions may be represented by a set I, and each element in the set I represents a path of a partition starting from the root node. Each path is used to query the quad-tree index formed by each spatial partition of the first resilient distributed dataset and the second resilient distributed dataset, and the spatial geometric object contained in the node matching the path is extracted.

Figure 12:
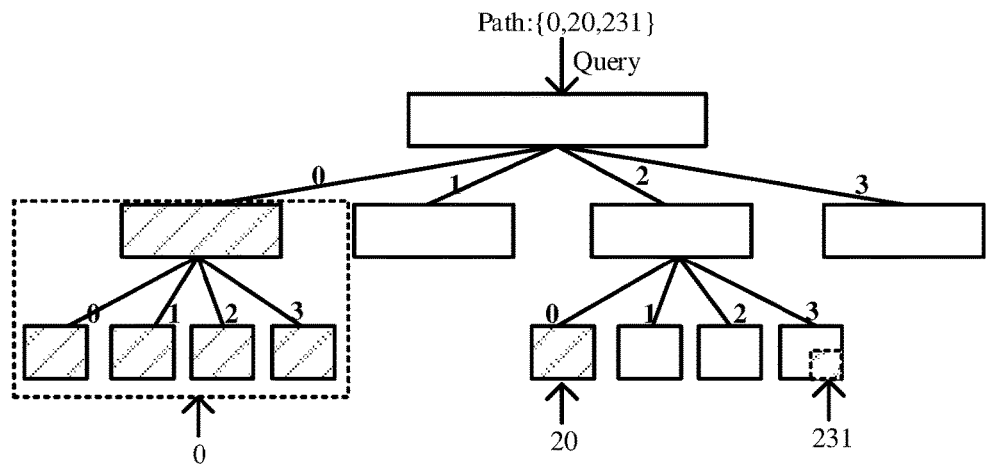
FIG. 12 is a schematic diagram of a principle of querying target data in a quad-tree index according to one or more embodiments of the present disclosure.

Referring to FIG. 12, FIG. 12 is a schematic diagram of a principle of querying target data in a quad-tree index according to one or more embodiments of the present disclosure. Given the path of the intersecting spatial partition and the rectangular spatial range of the root node, the spatial range $P_{bound}$ corresponding to the intersecting spatial partition may be calculated. Spatial geometric object intersecting $P_{bound}$ at each node is collected along the path from the root node from top to bottom. As shown in the path '0', when the bottom of the path P does not correspond to a leaf node, the geometric objects on the node and all its child nodes are collected; as shown in the path '20', when the bottom of the path P corresponds to exactly a leaf node, all geometric objects on the leaf node are collected; as shown in the path '231', when the path P fails to push down to the bottom and encounters a leaf node, the geometric object intersecting $P_{bound}$ on the leaf node is collected.

The spatial object set corresponding to the first resilient distributed dataset and the second resilient distributed dataset in each partition is obtained by querying the quad-tree index of each spatial partition, which is represented by Spark as RDD[(P,Set[Geometry])]. Among them, P represents the intersecting partition, and Set[Geometry] represents the spatial object within the intersecting partition. On this basis, by using cogroup operator of Spark, the spatial objects in the same partition of the first resilient distributed dataset and the second resilient distributed dataset may be aggregated together to generate RDD[(P,(Set[Geometry], Set[Geometry]))]. The final result of the spatial join query is obtained by executing the parallel computing process shown in FIG. 2(b).

According to the present disclosure, a resilient distributed dataset of spatial data is obtained, and a multi-tree spatial index is generated for the spatial partition in the resilient distributed dataset, so as to subdivide the spatial partition into a plurality of subspaces. The global spatial distribution information for describing the distribution of the geometric objects in the resilient distributed dataset may be obtained by collecting statistics about the spatial distribution information of the geometric objects. According to the present disclosure, the intersecting spatial partition is determined based on the global spatial distribution information of the first resilient distributed dataset and the second resilient distributed dataset, and the target data for which spatial join query needs to be performed is determined according to the intersecting spatial partition. Since only the geometric objects in the intersecting spatial partitions may have join, the above scheme may filter out the invalid data in the spatial data that do not contribute to the spatial join query, thereby reducing the computational complexity of the spatial join query operation, and improving the efficiency of the spatial join query. The present disclosure also provides a device for spatial join query, an electronic device, and a storage medium, which have the above beneficial effects, and are not repeated here.

Figure 13:
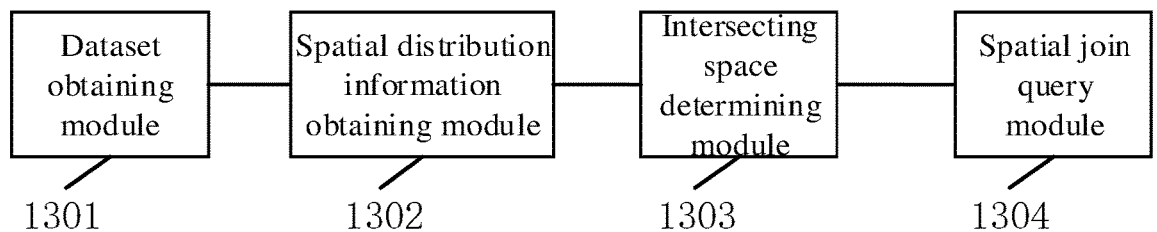
FIG. 13 is a schematic structural diagram of an apparatus for spatial join query according to one or more embodiments of the present disclosure.

Referring to FIG. 13, FIG. 13 is a schematic structural diagram of an apparatus for spatial join query according to one or more embodiments of the present disclosure, and the apparatus may include: a dataset obtaining module 1301, for obtaining a first resilient distributed dataset of a first spatial data and a second resilient distributed dataset of a second spatial data; wherein the first resilient distributed dataset and the second resilient distributed dataset include a plurality of spatial partitions; a spatial distribution information obtaining module 1302 for generating a multi-tree spatial index for the spatial partition, and obtaining the global spatial distribution information of the first resilient distributed dataset and global spatial distribution information of the second resilient distributed dataset by collecting spatial distribution information of geometric object according to the multi-tree spatial index; an intersecting space determining module 1303 for determining the intersecting spatial partition of the first resilient distributed dataset and the second resilient distributed dataset according to the global spatial distribution information; and a spatial join query module 1304 for setting the data corresponding to the intersecting spatial partition in the first spatial data and the second spatial data as target data, and performing spatial join calculation on the target data.

In this embodiment, a resilient distributed dataset of spatial data is obtained, and a multi-tree spatial index is generated for the spatial partitions in the resilient distributed dataset, so as to subdivide the spatial partition into a plurality of subspaces. The global spatial distribution information for describing the distribution of the geometric objects in the resilient distributed dataset may be obtained by statistics on the spatial distribution information of the geometric objects. In this embodiment, the intersecting spatial partition is determined based on the global spatial distribution information of the first resilient distributed dataset and the second resilient distributed dataset, and the target data that needs to perform a spatial join query is determined according to the intersecting spatial partition. Since only the geometric object in the intersecting spatial partitions has join, the above solution may filter out invalid data in the spatial data that do not contribute to the spatial join query, thereby reducing the computational complexity of the spatial join query operation, and improving the efficiency of the spatial join query.

Further, the spatial distribution information acquisition module 1302 includes: a quad-tree index generating unit for generating a quad-tree space index for the spatial partition, so as to divide the spatial partition into a plurality of subspaces; a geometric object query unit for querying the number of target geometric objects in each of the subspaces according to the quad-tree spatial index, and obtaining spatial distribution information of geometric objects; wherein, the subspace is the smallest subspace containing the target geometric objects.

Further, the quad-tree index generating unit is configured to generate the quad-tree spatial index for all the spatial partitions in parallel by Spark engine, so as to divide the spatial partition into a plurality of subspaces.

Further, the spatial distribution information acquisition module 1302 includes: a spatial partition information obtaining unit for collecting statistics about the spatial distribution information of geometric objects corresponding to each of the spatial partitions according to the multi-tree spatial index; an aggregating unit for obtaining the global spatial distribution information of the first resilient distributed dataset and the global spatial distribution information of the second resilient distributed dataset by aggregating the spatial distribution information of the geometric objects corresponding to all the spatial partitions.

Further, the intersecting space determining module 1303 includes: a peer node determining unit for determining peer nodes level by level according to the global spatial distribution information; wherein, the peer nodes correspond to nodes with the same path in the global spatial distribution information corresponding to the first resilient distributed dataset and the second resilient distributed dataset; a node screening unit for screening the peer nodes according to the statistical value of each node in the peer nodes, and obtaining the intersecting spatial partition of the first resilient distributed dataset and the second resilient distributed dataset; wherein, the statistic value is a statistic result of statistic about the spatial distribution information of the geometric object.

Further, the node screening unit includes: a first screening subunit for judging whether the statistical values of the leaf node and the parent node of the leaf node are both 0 if the peer nodes includes a leaf node and a non-leaf node, and if not, then setting the spatial partitions corresponding to the peer nodes as the intersecting spatial partitions of the first resilient distributed dataset and the second resilient distributed dataset; a second screening subunit for performing an operation of determining peer nodes level by level according to the global spatial distribution information if the peer nodes includes two non-leaf nodes; a third screening subunit for judging whether neither of the statistical values of the two leaf nodes are 0 if the peer nodes includes two leaf nodes; if neither of the statistical values of the two leaf nodes are 0, setting the spatial partitions corresponding to the peer nodes as intersecting spatial partitions of the first resilient distributed dataset and the second resilient distributed dataset.

Further, the spatial join query module 1304 includes: a target data determining unit for determining the target spatial range corresponding to the intersecting spatial partition, also for querying the geometric object intersecting with the target spatial range in the first spatial data and the second spatial data from the root node of the global space distribution information from top to bottom, and also for setting the spatial data of the geometric object intersecting with the target spatial range as the target data; a computing unit for performing spatial join computation on the target data.

Since the embodiment of the apparatus part corresponds to the embodiment of the method part, for the embodiment of the apparatus part, please refer to the description of the embodiment of the method part, which will not be repeated here.

The present disclosure also provides a storage medium on which a computer program is stored, and when the computer program is executed, the steps provided by the above embodiments may be implemented. The storage medium may include: U disk, removable hard disk, read-only memory (Read-Only Memory, ROM), random access memory (Random Access Memory, RAM), magnetic disk or optical disk and other media that may store program codes.

Figure 14:
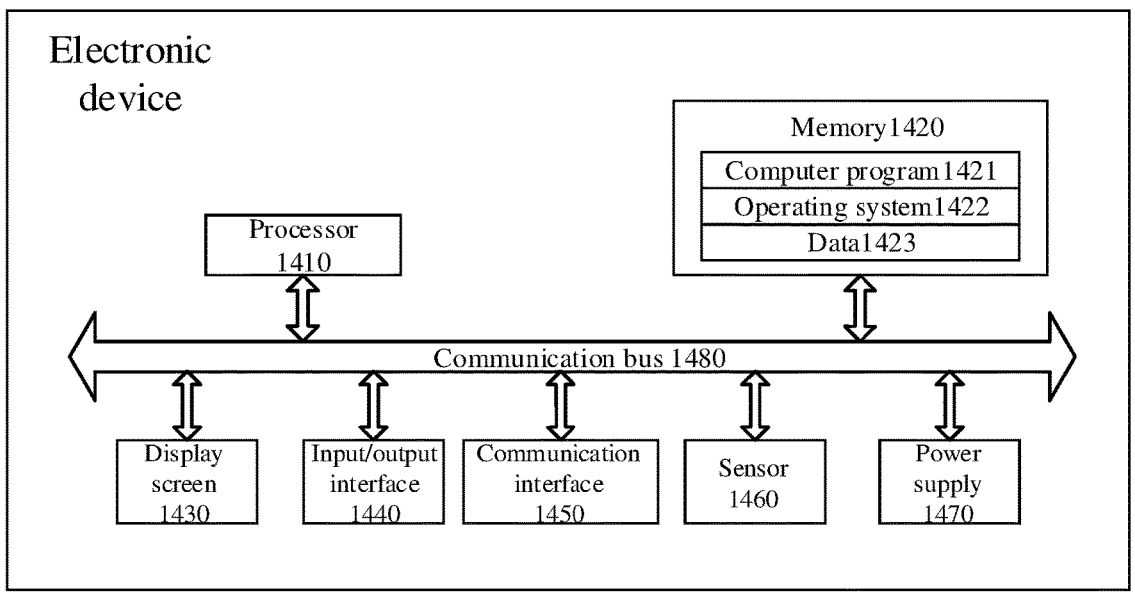
FIG. 14 is a structural diagram of an electronic device according to one or more embodiments of the present disclosure.

The present disclosure further provides an electronic device. Referring to FIG. 14, a structural diagram of an electronic device according to one or more embodiments of the present disclosure, as shown in FIG. 14, may include a processor 1410 and a memory 1420.

The processor 1410 may include one or more processing cores, such as a 4-core processor, an 8-core processor, and the like. The processor 1410 may be implemented by at least one hardware form of DSP (Digital Signal Processing), FPGA (Field-Programmable Gate Array), and PLA (Programmable Logic Array). The processor 1410 may also include a main processor and a co-processor. The main processor is a processor used to process data in the wake-up state, and is also called a CPU (Central Processing Unit); the co-processor is a low-power processor for processing data in a standby state. In some embodiments, the processor 1410 may be integrated with a GPU (Graphics Processing Unit), and the GPU is used for rendering and drawing the content that needs to be displayed on the display screen. In some embodiments, the processor 1410 may further include an AI (Artificial Intelligence) processor, where the AI processor is used to process computing operations related to machine learning.

Memory 1420 may include one or more computer-readable storage media, which may be non-transitory. Memory 1420 may also include high-speed random access memory, as well as non-volatile memory, such as one or more disk storage devices, flash storage devices. In this embodiment, the memory 1420 is at least used to store the following computer program 1421, wherein, after the computer program is loaded and executed by the processor 1410, the computer program may implement related steps of the method for spatial join query executed by the electronic device side disclosed in any of the foregoing embodiments. In addition, the resources stored in the memory 1420 may also include an operating system 1422 and data 1423, etc., and the storage mode may be short-term storage or permanent storage. The operating system 1422 may include Windows, Linux, Android, and the like.

In some embodiments, the electronic device may further include a display screen 1430, an input/output interface 1440, a communication interface 1450, a sensor 1460, a power supply 1470 and a communication bus 1480.

Of course, the structure of the electronic device shown in FIG. 14 does not constitute a limitation on the electronic device in the embodiments of the present disclosure. In practical disclosures, the electronic device may include more or less components than those shown in FIG. 14, or a combination of some part.

The various embodiments in the specification are described in a progressive manner, and each embodiment focuses on the differences from other embodiments, and the same and similar parts between the various embodiments may be referred to each other. As for the device disclosed in the embodiment, since it corresponds to the method disclosed in the embodiment, the description is relatively simple, and the relevant part may be referred to the description of the method. It should be pointed out that for those of ordinary skill in the art, without departing from the principles of the present disclosure, several improvements and modifications may also be made to the present disclosure, and these improvements and modifications also fall within the protection scope of the claims of the present disclosure.

It should also be noted that, in this specification, relational terms such as first and second, etc. are only used to distinguish one entity or operation from another entity or operation, and do not necessarily require or imply these entities or operations. There is no such actual relationship or sequence between operations. Moreover, the terms "comprising", "comprising" or any other variation thereof are intended to encompass non-exclusive inclusion such that a process, method, article or device comprising a list of elements includes not only those elements, but also includes not explicitly listed or other elements inherent to such a process, method, article or apparatus. Without further limitation, an element qualified by the phrase "comprising a . . . " does not preclude the presence of additional identical elements in a process, method, article, or device that includes the element.

What is claimed is:

1. A method for spatial join query, comprising:
    obtaining a first resilient distributed dataset of first spatial data and a second resilient distributed dataset of second spatial data; wherein the first resilient distributed dataset and the second resilient distributed dataset comprise a plurality of spatial partitions;
    generating multi-tree spatial indexes for the spatial partitions, and collecting statistics about spatial distribution information of geometric objects according to the multi-tree spatial indexes, and obtaining global spatial distribution information of the first resilient distributed dataset and global spatial distribution information of the second resilient distributed dataset;
    determining an intersecting spatial partition of the first resilient distributed dataset and the second resilient distributed dataset according to the global spatial distribution information; and
    setting data corresponding to the intersecting spatial partition in the first spatial data and the second spatial data as target data, and performing spatial join calculation on the target data,
    wherein said determining an intersecting spatial partition of the first resilient distributed dataset and the second resilient distributed dataset according to the global spatial distribution information comprises:
    determining peer nodes level by level according to the global spatial distribution information; wherein, the peer nodes are nodes which have the same path in the global spatial distribution information corresponding to the first resilient distributed dataset and the second resilient distributed dataset node; and
    screening the peer nodes according to a statistical value of each node in the peer nodes, and obtaining the intersecting spatial partition of the first resilient distributed dataset and the second resilient distributed dataset; wherein, the statistic value is a statistic result of collecting statistics about the spatial distribution information of geometric object,
    wherein said screening the peer nodes according to a statistical value of each node in the peer nodes, and obtaining the intersecting spatial partition of the first resilient distributed dataset and the second resilient distributed dataset comprises:
    in response to determining that the peer nodes comprise a leaf node and a non-leaf node, determining whether the statistical values of the leaf node and a parent node of the leaf node are both 0; in response to determining that any one of the statistical values of the leaf node and the parent node of the leaf node is not 0, setting the spatial partition corresponding to the peer nodes as an intersecting spatial partition of the first resilient distributed dataset and the second resilient distributed dataset;
    in response to determining that the peer nodes comprise two non-leaf nodes, determining the peer nodes level by level according to the global spatial distribution information; and
    in response to determining that the peer nodes comprise two leaf nodes, determining whether neither of the statistical values of the two leaf nodes are 0; in response to determining that neither of the statistical values of the two leaf nodes are 0, setting the spatial partition corresponding to the peer nodes as the intersecting spatial partition of the first resilient distributed dataset and the second resilient distributed dataset.

2. The method according to claim 1, wherein said generating the multi-tree spatial indexes for the spatial partitions, and collecting statistics about spatial distribution information of geometric objects according to the multi-tree spatial indexes, comprises:
    generating quad-tree spatial indexes for the spatial partitions, so as to divide the spatial partitions into a plurality of subspaces; and
    obtaining the spatial distribution information of the geometric objects by querying a number of target geometric objects in each subspace according to the quad-tree spatial indexes; wherein, the subspaces are the smallest subspaces containing the target geometric objects.

3. The method according to claim 2, wherein said generating quad-tree spatial indexes for the spatial partitions comprises:
    generating the quad-tree spatial indexes in parallel for all the spatial partitions by a Spark engine.

4. The method according to claim 1, wherein said collecting statistics about spatial distribution information of geometric objects according to the multi-tree spatial indexes, and obtaining global spatial distribution information of the first resilient distributed dataset and global spatial distribution information of the second resilient distributed dataset, comprises:
    collecting statistics about the spatial distribution information of geometric object corresponding to each of the spatial partitions according to the multi-tree spatial indexes; and
    obtaining the global spatial distribution information of the first resilient distributed dataset and the global spatial distribution information of the second resilient distributed dataset by aggregating the spatial distribution information of the geometric objects corresponding to all the spatial partitions.

5. The method according to claim 1, wherein said setting data corresponding to the intersecting spatial partition in the first spatial data and the second spatial data as target data comprises:
- determining a target spatial range corresponding to the intersecting spatial partition;
- querying the geometric objects intersecting with the target spatial range in the first spatial data and the second spatial data from a root node of the global spatial distribution information from top to bottom; and
- setting spatial data of the geometric objects intersecting with the target spatial range as the target data.

6. An electronic device, comprising:
a memory; and
a processor, wherein a computer program is stored in the memory, and when the processor invokes the computer program in the memory, following steps are implemented:
- obtaining a first resilient distributed dataset of first spatial data and a second resilient distributed dataset of second spatial data; wherein the first resilient distributed dataset and the second resilient distributed dataset comprise a plurality of spatial partitions;
- generating multi-tree spatial indexes for the spatial partitions, and collecting statistics about spatial distribution information of geometric objects according to the multi-tree spatial indexes, and obtaining global spatial distribution information of the first resilient distributed dataset and global spatial distribution information of the second resilient distributed dataset;
- determining an intersecting spatial partition of the first resilient distributed dataset and the second resilient distributed dataset according to the global spatial distribution information; and
- setting data corresponding to the intersecting spatial partition in the first spatial data and the second spatial data as target data, and performing spatial join calculation on the target data,
wherein said determining an intersecting spatial partition of the first resilient distributed dataset and the second resilient distributed dataset according to the global spatial distribution information comprises:
- determining peer nodes level by level according to the global spatial distribution information; wherein, the peer nodes are nodes which have the same path in the global spatial distribution information corresponding to the first resilient distributed dataset and the second resilient distributed dataset node; and
- screening the peer nodes according to a statistical value of each node in the peer nodes, and obtaining the intersecting spatial partition of the first resilient distributed dataset and the second resilient distributed dataset; wherein, the statistic value is a statistic result of collecting statistics about the spatial distribution information of geometric object
wherein said screening the peer nodes according to a statistical value of each node in the peer nodes, and obtaining the intersecting spatial partition of the first resilient distributed dataset and the second resilient distributed dataset comprises:
- in response to determining that the peer nodes comprise a leaf node and a non-leaf node, determining whether the statistical values of the leaf node and a parent node of the leaf node are both 0; in response to determining that any one of the statistical values of the leaf node and the parent node of the leaf node is not 0, setting the spatial partition corresponding to the peer nodes as an intersecting spatial partition of the first resilient distributed dataset and the second resilient distributed dataset;
- in response to determining that the peer nodes comprise two non-leaf nodes, determining the peer nodes level by level according to the global spatial distribution information; and
- in response to determining that the peer nodes comprise two leaf nodes, determining whether neither of the statistical values of the two leaf nodes are 0; in response to determining that neither of the statistical values of the two leaf nodes are 0, setting the spatial partition corresponding to the peer nodes as the intersecting spatial partition of the first resilient distributed dataset and the second resilient distributed dataset.

7. The device according to claim 6, wherein said generating the multi-tree spatial indexes for the spatial partitions, and collecting statistics about spatial distribution information of geometric objects according to the multi-tree spatial indexes, comprises:
- generating quad-tree spatial indexes for the spatial partitions, so as to divide the spatial partitions into a plurality of subspaces; and
- obtaining the spatial distribution information of the geometric objects by querying a number of target geometric objects in each subspace according to the quad-tree spatial indexes; wherein, the subspaces are the smallest subspaces containing the target geometric objects.

8. The device according to claim 6, wherein said generating quad-tree spatial indexes for the spatial partitions comprises:
- generating the quad-tree spatial indexes in parallel for all the spatial partitions by a Spark engine.

9. The device according to claim 6, wherein said collecting statistics about spatial distribution information of geometric objects according to the multi-tree spatial indexes, and obtaining global spatial distribution information of the first resilient distributed dataset and global spatial distribution information of the second resilient distributed dataset, comprises:
- collecting statistics about the spatial distribution information of geometric object corresponding to each of the spatial partitions according to the multi-tree spatial indexes; and
- obtaining the global spatial distribution information of the first resilient distributed dataset and the global spatial distribution information of the second resilient distributed dataset by aggregating the spatial distribution information of the geometric objects corresponding to all the spatial partitions.

10. The device according to claim 6, wherein said setting data corresponding to the intersecting spatial partition in the first spatial data and the second spatial data as target data comprises:
- determining a target spatial range corresponding to the intersecting spatial partition;
- querying the geometric objects intersecting with the target spatial range in the first spatial data and the second spatial data from a root node of the global spatial distribution information from top to bottom; and
- setting spatial data of the geometric objects intersecting with the target spatial range as the target data.

11. A non-transitory computer readable storage medium, wherein the storage medium stores computer-executable instructions, and when the computer-executable instructions are loaded and executed by a processor, following steps are implemented:

obtaining a first resilient distributed dataset of first spatial data and a second resilient distributed dataset of second spatial data; wherein the first resilient distributed dataset and the second resilient distributed dataset comprise a plurality of spatial partitions;

generating multi-tree spatial indexes for the spatial partitions, and collecting statistics about spatial distribution information of geometric objects according to the multi-tree spatial indexes, and obtaining global spatial distribution information of the first resilient distributed dataset and global spatial distribution information of the second resilient distributed dataset;

determining an intersecting spatial partition of the first resilient distributed dataset and the second resilient distributed dataset according to the global spatial distribution information; and setting data corresponding to the intersecting spatial partition in the first spatial data and the second spatial data as target data, and performing spatial join calculation on the target data, wherein said determining an intersecting spatial partition of the first resilient distributed dataset and the second resilient distributed dataset according to the global spatial distribution information comprises:

determining peer nodes level by level according to the global spatial distribution information; wherein, the peer nodes are nodes which have the same path in the global spatial distribution information corresponding to the first resilient distributed dataset and the second resilient distributed dataset node; and screening the peer nodes according to a statistical value of each node in the peer nodes, and obtaining the intersecting spatial partition of the first resilient distributed dataset and the second resilient distributed dataset; wherein, the statistic value is a statistic result of collecting statistics about the spatial distribution information of geometric object wherein said screening the peer nodes according to a statistical value of each node in the peer nodes, and obtaining the intersecting spatial partition of the first resilient distributed dataset and the second resilient distributed dataset comprises:

in response to determining that the peer nodes comprise a leaf node and a non-leaf node, determining whether the statistical values of the leaf node and a parent node of the leaf node are both 0; in response to determining that any one of the statistical values of the leaf node and the parent node of the leaf node is not 0, setting the spatial partition corresponding to the peer nodes as an intersecting spatial partition of the first resilient distributed dataset and the second resilient distributed dataset;

in response to determining that the peer nodes comprise two non-leaf nodes, determining the peer nodes level by level according to the global spatial distribution information; and in response to determining that the peer nodes comprise two leaf nodes, determining whether neither of the statistical values of the two leaf nodes are 0; in response to determining that neither of the statistical values of the two leaf nodes are 0, setting the spatial partition corresponding to the peer nodes as the intersecting spatial partition of the first resilient distributed dataset and the second resilient distributed dataset.

12. The non-transitory computer readable storage medium according to claim 11, wherein said generating the multi-tree spatial indexes for the spatial partitions, and collecting statistics about spatial distribution information of geometric objects according to the multi-tree spatial indexes, comprises:

generating quad-tree spatial indexes for the spatial partitions, so as to divide the spatial partitions into a plurality of subspaces; and obtaining the spatial distribution information of the geometric objects by querying a number of target geometric objects in each subspace according to the quad-tree spatial indexes; wherein, the subspaces are the smallest subspaces containing the target geometric objects.

13. The non-transitory computer readable storage medium according to claim 11, wherein said generating quad-tree spatial indexes for the spatial partitions comprises:

generating the quad-tree spatial indexes in parallel for all the spatial partitions by a Spark engine.

14. The non-transitory computer readable storage medium according to claim 11, wherein said collecting statistics about spatial distribution information of geometric objects according to the multi-tree spatial indexes, and obtaining global spatial distribution information of the first resilient distributed dataset and global spatial distribution information of the second resilient distributed dataset, comprises:

collecting statistics about the spatial distribution information of geometric object corresponding to each of the spatial partitions according to the multi-tree spatial indexes; and obtaining the global spatial distribution information of the first resilient distributed dataset and the global spatial distribution information of the second resilient distributed dataset by aggregating the spatial distribution information of the geometric objects corresponding to all the spatial partitions.

* * * * *